United States Patent
De Gooijer et al.

(10) Patent No.: US 10,100,726 B2
(45) Date of Patent: Oct. 16, 2018

(54) FOUR-STROKE INTERNAL COMBUSTION ENGINE WITH VARIABLE COMPRESSION RATIO

(71) Applicant: Gomecsys B.V., Naarden (NL)

(72) Inventors: Lambertus Hendrik De Gooijer, Naarden (NL); Sander Wagenaar, Huizen (NL); Willem-Constant Wagenvoort, Huizen (NL)

(73) Assignee: GOMECSYS B.V., Naarden (NL)

( * ) Notice: Subject to any disclaimer, the term of this patent is extended or adjusted under 35 U.S.C. 154(b) by 0 days.

(21) Appl. No.: 15/119,669

(22) PCT Filed: Feb. 17, 2015

(86) PCT No.: PCT/EP2015/053311
§ 371 (c)(1),
(2) Date: Aug. 17, 2016

(87) PCT Pub. No.: WO2015/124565
PCT Pub. Date: Aug. 27, 2015

(65) Prior Publication Data
US 2017/0009648 A1    Jan. 12, 2017

(30) Foreign Application Priority Data

Feb. 18, 2014 (EP) ...................... 14155560

(51) Int. Cl.
*F02B 75/32* (2006.01)
*F02B 75/04* (2006.01)
*F02B 75/02* (2006.01)

(52) U.S. Cl.
CPC ............ *F02B 75/048* (2013.01); *F02B 75/02* (2013.01); *F02B 2075/027* (2013.01)

(58) Field of Classification Search
CPC ........... F02B 75/32; F02B 41/02; F02B 75/04
See application file for complete search history.

(56) References Cited

U.S. PATENT DOCUMENTS

| 1,553,009 A | 9/1925 | Stuke |
| 5,680,840 A * | 10/1997 | Mandella ............... F02B 75/04 123/197.4 |

(Continued)

FOREIGN PATENT DOCUMENTS

| EP | 1205652 A1 | 5/2002 | |
| EP | 1959112 A1 * | 8/2008 | ............. F02B 75/04 |

(Continued)

OTHER PUBLICATIONS

International Search Report and Written Opinion for International application No. PCT/E2015/053311, dated May 26, 2015.

*Primary Examiner* — Jacob Amick
*Assistant Examiner* — Charles Brauch
(74) *Attorney, Agent, or Firm* — Steven M. Koehler; Westman, Champlin & Koehler, P.A.

(57) ABSTRACT

A four-stroke internal combustion engine with variable compression ratio, comprises a crankcase, a crankshaft, a connecting rod having a big end and a small end. A piston is rotatably connected to the small end. A crank member rotatably mounted on the crankpin has a bearing portion which is eccentrically disposed with respect to the crankpin, wherein the bearing portion has an outer circumferential wall including a location of maximum eccentricity (P) which bears the big end of the connecting rod such that the connecting rod is rotatably mounted on the bearing portion of the crank member via the big end. Under operating conditions at or close to top dead center of the piston the angle between the connecting rod plane and the piston plane changes from a pre-angle before top dead center to a post-angle after top dead center.

13 Claims, 11 Drawing Sheets

(56) References Cited

U.S. PATENT DOCUMENTS

2002/0056340 A1    5/2002   Weiss
2014/0360292 A1   12/2014   De Gooijer

FOREIGN PATENT DOCUMENTS

| EP | 14154745 A1 | 8/2015 |
|---|---|---|
| FR | 861611 A | 2/1941 |
| FR | 1014314 A | 8/1952 |
| FR | 2940362 A1 | 6/2010 |
| WO | 9627079 A1 | 9/1996 |
| WO | 9963247 A | 12/1999 |
| WO | 2013110700 A1 | 8/2013 |

\* cited by examiner

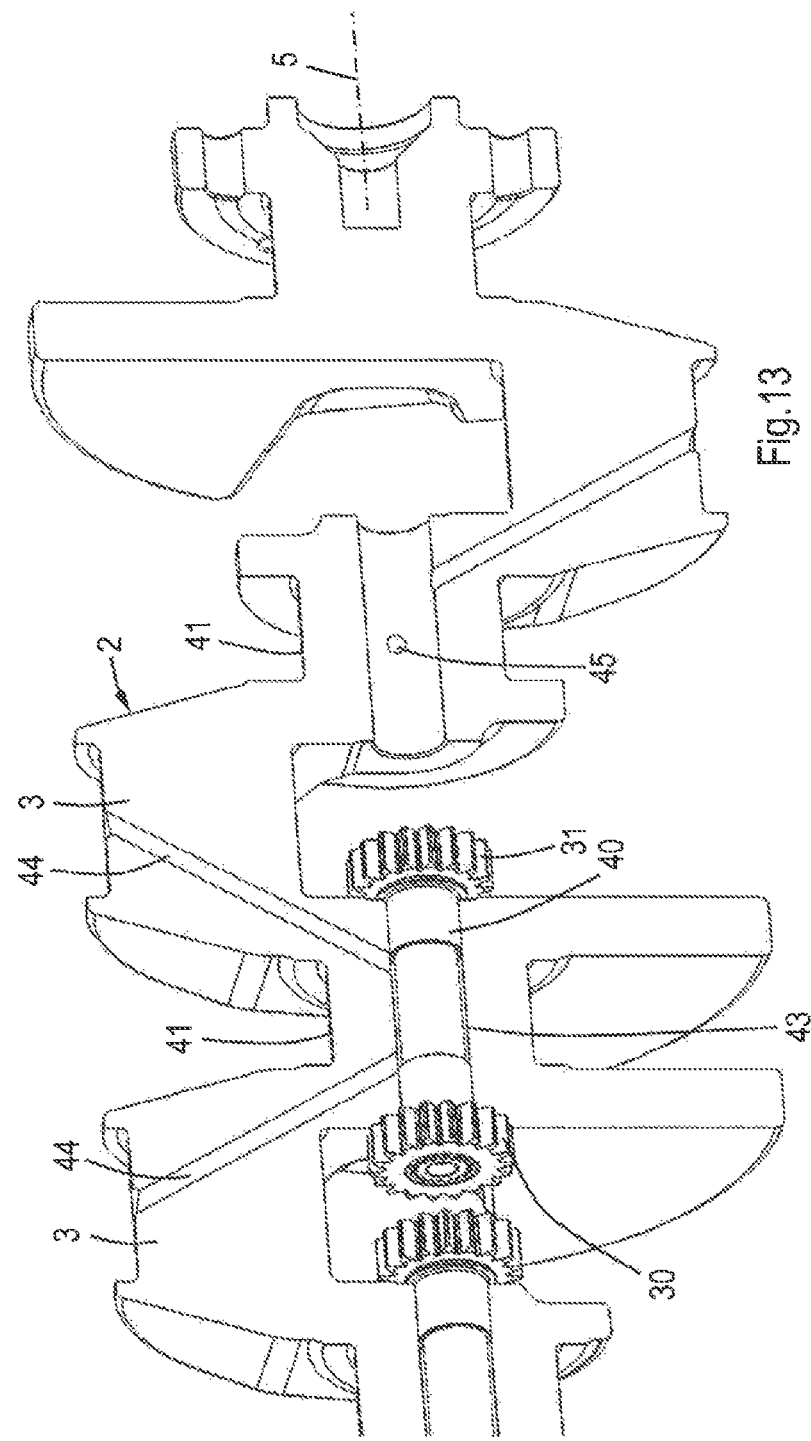

FOUR-STROKE INTERNAL COMBUSTION ENGINE WITH VARIABLE COMPRESSION RATIO

CROSS-REFERENCE TO RELATED APPLICATION

This application is a Section 371 National Stage Application of International Application PCT/EP2015/053311 filed Feb. 17, 2015 and published as WO2015/124565A1 in English.

BACKGROUND

The discussion below is merely provided for general background information and is not intended to be used as an aid in determining the scope of the claimed subject matter.

The present invention relates to a four-stroke internal combustion engine with variable compression ratio.

A four-stroke internal combustion engine is well-known. The piston completes four successive strokes during two revolutions of the crankshaft: an inlet stroke, a compression stroke, a combustion stroke and an exhaust stroke. It is also well-known that an engine with variable compression ratio provides the opportunity to operate the engine at high efficiency, particularly under part-load conditions. Increasing compression ratio leads to decreasing fuel consumption. At high-load or full-load the compression ratio must be lowered in order to avoid knocking. Several earlier applications of the applicant disclose internal combustion engines with variable compression ratio, for example WO 2013/110700.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background. A four-stroke, internal combustion engine with variable compression ratio includes a crankcase, a crankshaft being rotatable with respect to the crankcase about a crankshaft axis, wherein the crankshaft has a crankpin including a crankpin axis. A connecting rod includes a big end and a small end, wherein the connecting rod has a center line which lies in a connecting rod plane. A piston is rotatably connected to the small end, wherein the piston is movable in a direction parallel to a piston plane in which the crankshaft axis lies. A crank member is rotatably mounted on the crankpin, and comprises a bearing portion which is eccentrically disposed with respect to the crankpin. The bearing portion has an outer circumferential wall that includes a location of maximum eccentricity (P) which bears the big end of the connecting rod such that the connecting rod is rotatably mounted on the bearing portion of the crank member via the big end. The bearing portion has a center line which lies in the connecting rod plane, wherein under operating conditions at or close to top dead center of the piston the angle between the connecting rod plane and the piston plane changes from a pre-angle before top dead center to a post-angle after top dead center. A drive mechanism rotates the crank member with respect to the crankshaft, which is configured such that the crank member rotates in the same direction as the crankshaft, whereas the rotation frequency of the crank member is substantially half of that of the crankshaft, as seen from the crankcase. A control mechanism adjusts the mutual rotational position of the crank member and the crankpin at a virtual standstill of the crankshaft in order to be able to vary the compression ratio between a minimum compression ratio and a maximum compression ratio. The crank member is provided with at least a crank member oil channel for transporting oil through the crank member to an opening in the circumferential wall of the bearing portion. The opening is located outside a closed bearing range (A-B) having a first edge (A) and a second edge (B), wherein the first edge (A) is located at an intersection with the connecting rod plane where the circumferential wall faces the piston at a predetermined pre-angle in the condition of maximum compression ratio close to the end of the compression stroke, and wherein the second edge (B) is located at an intersection with the connecting rod plane where the circumferential wall faces the piston at a predetermined post-angle in the condition of minimum compression ratio in the combustion stroke, wherein the closed bearing range (A-B) extends from the first edge (A) in a direction opposite to the rotational direction of the crank member with respect to the crankcase under operating condition at fixed compression ratio.

An advantage of the engine is that during the final part of the compression stroke and the first part of the combustion stroke there is no opening in the circumferential wall of the bearing portion present in the connecting rod plane. This means that combustion force which acts from the big end onto the bearing portion along the connecting rod plane can be received appropriately, because the presence of an opening would reduce the local bearing load capacity. The absence of an opening in the closed bearing range provides sufficient bearing load capacity of the crank member in low-load conditions as well as in high-load conditions, in which the compression ratio is high and low, respectively.

It is noted that due to the eccentricity of the bearing portion the crankpin axis and the center line of the bearing portion extend parallel to each other and to the crankshaft axis. Furthermore, both the center line of the connecting rod and the center line of the bearing portion of the crank member lie in the connecting rod plane. The words 'close to the end of the compression stroke' may be interpreted as 'in the second half of the compression stroke between bottom dead center and top dead center', whereas the words 'in the combustion stroke' may be interpreted as 'in the first half of the combustion stroke between top dead center and bottom dead center'. During the compression stroke the piston moves from its bottom dead center to its top dead center and during the subsequent combustion stroke the piston moves from its top dead center to its bottom dead center. Normally, in top dead center the crankshaft axis and the crankpin axis lie in the piston plane, whereas the center line of the piston pin may also lie in the piston plane. It is noted, however, that the center line of the piston may have an offset with respect to the piston plane.

The drive mechanism for rotating the crank member with respect to the crankshaft may comprise a gear transmission between the crankshaft and the crank member. For example, WO 2013/110700 discloses a gear transmission, wherein the crank member is provided with an external crank member gear that meshes with two external intermediate gears. The intermediate gears are rotatably mounted to the crankshaft and their axes of rotation extend parallel to the crankshaft axis. Each of the intermediate gears also meshes with an external auxiliary gear. The auxiliary gear is fixed to an auxiliary shaft, which extends concentrically through the crankshaft and is rotatable with respect to the crankshaft about the crankshaft axis. The center line of the auxiliary gear coincides with the crankshaft axis. The gear dimensions can be selected such that under operating conditions the crank member rotates in the same direction as the crankshaft and at half speed thereof, as seen from the crankcase, when the auxiliary shaft is held at a fixed angular position with respect to the crankcase.

The control mechanism for adjusting the mutual rotational position of the crank member and the crankshaft at virtual standstill of the crankshaft serves to vary the compression ratio between a minimum compression ratio and a maximum compression ratio. This can be performed in numerous ways, for example by turning the above-mentioned auxiliary shaft through a worm/worm gear transmission or a hydraulic actuator as disclosed in EP 14154745 of the same applicant as the present application.

The condition of maximum compression ratio may be created by selecting the mutual rotational position of the crank member and the crankpin such that at the end of the compression stroke in top dead center the location of maximum eccentricity lies in the piston plane beyond the crankpin axis as seen from the crankshaft axis. In this case the piston reaches its maximum possible top dead center position.

The condition of minimum compression ratio may be created by selecting the mutual rotational position of the crank member and the crankpin such that at the end of the compression stroke in top dead center the location of maximum eccentricity lies at an angle between 90 and 180° about the crankpin axis from an intersection between the piston plane and a side of the bearing portion facing the piston, in rotational direction of the crank member with respect to the crankcase under operating conditions at fixed compression ratio. More specifically, the angle may be between 120 and 150°, for example 135°.

The location of maximum eccentricity may lie within the closed bearing range. This may be the case, for example, if at the end of the compression stroke in top dead center the location of maximum eccentricity lies in the piston plane beyond the crankpin axis as seen from the crankshaft axis, in order to create the condition of maximum compression ratio.

In a specific embodiment the opening is a first opening and the circumferential wall of the bearing portion is provided with a second opening for supplying oil between the bearing portion and the big end, wherein the first opening is provided at the first edge and the second opening is provided at the second edge of the closed bearing range. In this case, the second opening provides the opportunity to transfer lubricant to the circumferential wall of the bearing portion towards the connecting rod in addition to the first opening.

The pre-angle and post-angle may be selected such that in top dead center at the end of the compression stroke at the maximum compression ratio the first edge lies at an angle between 10 and 30° about the crankpin axis from an intersection between the piston plane and a side of the bearing portion facing the piston, in rotational direction of the crank member with respect to the crankcase, whereas the second edge lies at an angle between 150 and 170° about the crankpin axis from an intersection between the piston plane and a side of the bearing portion facing the piston, in rotational direction of the crank member with respect to the crankcase. This is the rotational direction of the crank member under operating conditions at fixed compression ratio.

The oil channel may comprise a through-hole extending radially through the bearing portion to an inner wall opening in an inner wall of the crank member, wherein the inner wall opening is located at or close to the center of the crank member in longitudinal direction thereof. This means that a bearing surface between the crankpin and the crank member is discontinuous in longitudinal direction; in other words, there are two bearing surfaces, each located at opposite sides of the inner wall opening. A radial oil channel can be manufactured relatively easily. The inner wall opening may be located in a circumferential oil channel or groove, in the inner wall of the crank member where lubricant is received from the associated. crankpin. The crankpin may have an oil supply opening opposite to the mentioned circumferential oil channel.

The oil channel may have a branch extending in longitudinal direction of the crank member for supplying oil to the crankpin at a location of the inner wall of the crank member which is remote from the inner wall opening in longitudinal direction of the crank member. The mentioned location of the inner wall of the crank member may lie between the inner wall opening and an axial end of the crank member, for example in the center thereof so as to supply lubricant between the crankpin and the crank member. In practice, there may be two branches at opposite sides of the oil channel in order to be able to supply oil to both sides of the circumferential oil channel in the inner wall of the crank member. It is noted that the inner wall of the crank member may be formed by bearing cups.

In an alternative embodiment the opening in the circumferential wall of the bearing portion communicates through the oil channel with an inner wall opening in an inner wall of the crank member, which inner wall opening lies at a distance from the opening in the circumferential wall in longitudinal direction of the crank member. The inner wall opening may be located in a circumferential oil channel or groove in the inner wall of the crank member where lubricant is received from the associated crankpin. An advantage of this embodiment is that a relatively small crank member, as seen in longitudinal direction thereof, with a relatively broad bearing surface between the crankpin and the crank member can be applied. For example, the opening in the circumferential wall may be located at the center of the crank member, whereas the inner wall opening may be close to an axial end of the crank member, resulting in a relatively broad bearing surface between the crankpin and the crank member in longitudinal direction thereof at one side of the inner wall opening. In case of a through-hole that extends radially through the bearing portion to the inner wall opening there are two relatively narrow bearing surfaces at opposite sides of the inner wall opening.

The crank member may be made of one piece that is mounted on the crankpin before assembly of the crankshaft. This means that the crankpin is fixed to the remainder of the crankshaft after the crank member is mounted to the crankpin in axial direction thereof. It is noted that the crank member may be provided with bearing cups which are composed of different parts. As the crankshaft is composed of separate parts requiring rigid and voluminous attachments the crank members are preferably as small as possible in longitudinal direction so as to obtain a compact engine. Hence, an oil channel including a distance between the opening in the circumferential wall and the inner wall opening is advantageous.

In case of applying a crankshaft made of one piece the crank members may be relatively large in longitudinal direction. This allows to apply a simple through-hole that extends radially through the bearing portion to the inner wall opening, providing two relatively narrow bearing surfaces at opposite sides of the inner wall opening.

The control mechanism may comprise a worm and a worm gear which is fixed to the auxiliary shaft, wherein the worm and worm gear are located in a chamber that communicates with a space between the auxiliary shaft and the crankshaft. This causes the lubricant to flow from that space into the chamber. The chamber may be part of the lubrication circuit of the engine such that lubricant flows through the chamber continuously in order to supply fresh oil to the worm/worm gear transmission. In practice the chamber may be located outside the crankcase where the crankshaft and the auxiliary shaft project from the crankcase. Furthermore, the auxiliary shaft may be supported by a bearing disposed in that chamber, as well, for example a needle bearing, such that the lubricant also flows through that bearing under operating conditions.

In a particular embodiment the crank member and the crankpin are a first crank member and a first crankpin, respectively, wherein the engine comprises a second crank member and an associated second crankpin, wherein a crankshaft bearing is located between the crankpins, and wherein the crank members are drivably coupled to each other via a transfer shaft which is rotatably and concentrically mounted in the crankshaft at the crankshaft bearing, wherein opposite end portions of the transfer shaft are supported by the crankshaft, whereas a cavity is present between a central portion of the transfer shaft and the crankshaft, which cavity communicates with an outer side of the crankshaft at the crankshaft bearing, on the one hand, and with the outer sides of the respective crankpins, on the other hand.

BRIEF DESCRIPTION OF THE DRAWINGS

Aspects of the invention will hereafter be elucidated with reference to the schematic drawings showing embodiments of the invention by way of example.

FIG. 13 is a perspective cross-sectional view of a part of the crankshaft as shown in FIG. 9.

DETAILED DESCRIPTION OF THE ILLUSTRATIVE EMBODIMENTS

Figure 1:
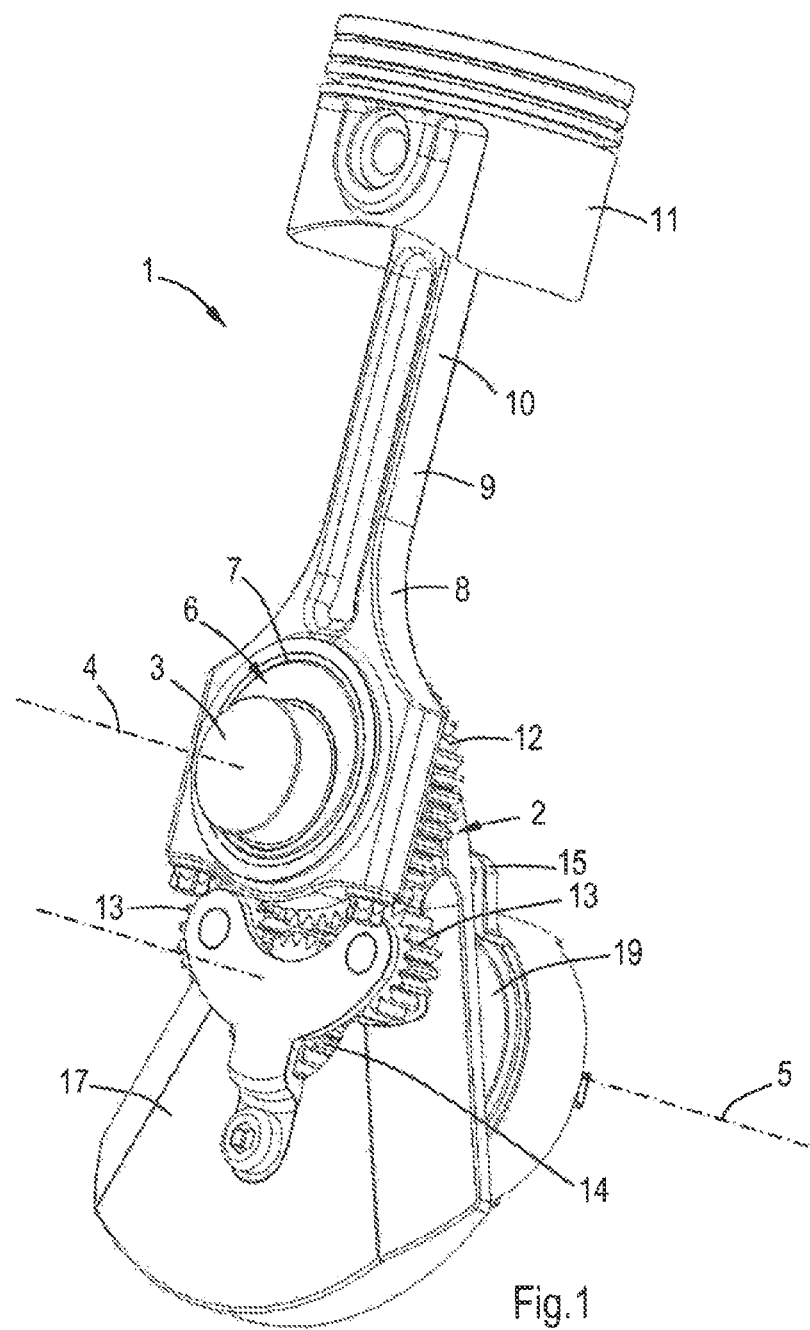
FIGS. 1 and 2 are perspective views from different sides and at different scales of an embodiment of an internal combustion engine.
Figure 2:
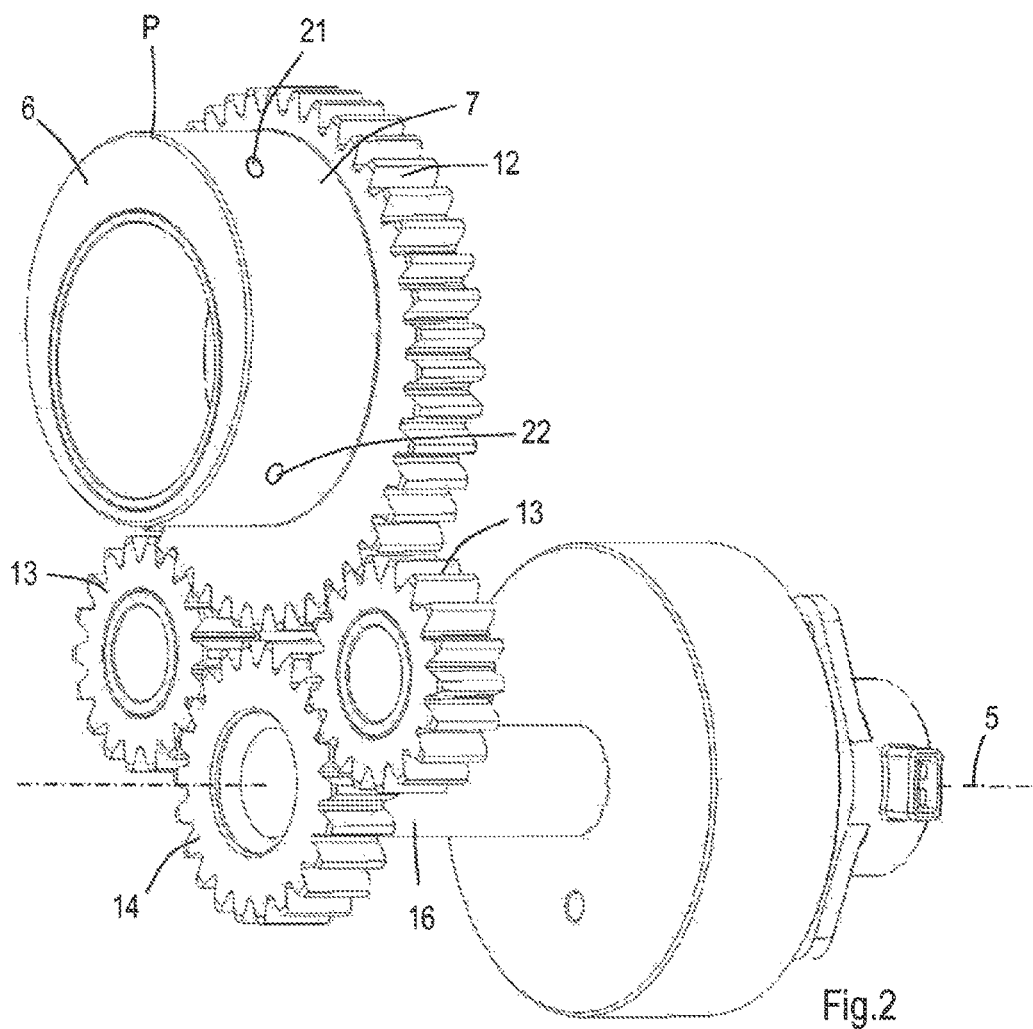

FIGS. 1 and 2 show different sides of a part of an embodiment of an internal combustion engine 1 with variable compression ratio. The internal combustion engine 1 is a four-stroke engine and comprises a crankcase (not shown), which supports a crankshaft 2. The crankshaft 2 has a crankpin 3 including a crankpin axis 4 and is rotatable with respect to the crankcase about a crankshaft axis 5. The engine 1 comprises a crank member 6 which is rotatably mounted on the crankpin 3. The crank member 6 is provided with a bearing portion 7 which is disposed eccentrically with respect to the crankpin 3, see FIG. 2. The bearing portion 7 has an outer circumferential wall which bears a big end 8 of a connecting rod 9. The bearing portion 7 has a circular cross-section and a location of maximum eccentricity, indicated by reference sign P in FIG. 2. A center line of the connecting rod 9 and a center line of the circumferential wall of the bearing portion 7 extend perpendicularly to each other and to in a connecting rod plane.

The connecting rod 9 is rotatably mounted on the crank member 6 via its big end 8. The connecting rod 9 also includes a small end 10 to which a piston 11 is rotatably connected by means of a crankpin. The piston 11 is displaceable reciprocatingly in a cylinder and can translate in a direction parallel to a piston plane in which the crankshaft axis 5 and a center line of the piston pin lies. It is noted that in FIG. 2 the crankshaft 2 and connecting rod 9 are not shown for clarity reasons.

Under operating conditions the connecting rod 9 swings back and forth with respect to the piston plane. Around top dead center of the piston 11 the angle between the connecting rod plane and the piston plane changes from a pre-angle before top dead center to a post-angle after top dead center. At or very close to top dead center the presence of a pre-angle or post-angle is also dependent on the position of the selected location of maximum eccentricity P. For example, the piston may be at top dead center whereas the connecting rod plane is slightly angled with respect to the piston plane.

The engine 1 comprises a drive mechanism for rotating the crank member 6 with respect to the crankshaft 2. The drive mechanism is adapted such that the rotation frequency of the crank member 6 with respect to the crankcase is substantially half of that of the crankshaft 2.

In the embodiment as shown in FIGS. 1 and 2 the drive mechanism is provided with a gear transmission to achieve the mentioned ratio of rotation frequencies. The crank member 6 is provided with an external crank member gear 12 for driving the crank member 6. The crank member gear 12 meshes with two external intermediate gears 13. The intermediate gears 13 are rotatably mounted to the crankshaft 2 and their axes of rotation extend parallel to the crankshaft axis 5. Each of the intermediate gears 13 also meshes with an external auxiliary gear 14. The auxiliary gear 14 is fixed to an auxiliary shaft 16. The auxiliary shaft 16 extends concentrically through the crankshaft 2 and is rotatable with respect to the crankshaft 2 about the crankshaft axis 5. Thus, the auxiliary shaft 16 is rotatable about an auxiliary shaft axis which substantially coincides with the crankshaft axis 5. As a consequence, the center line of the auxiliary gear 14 coincides with the crankshaft axis 5.

The gear dimensions are selected such that under operating conditions the crank member 6 rotates in the same direction as the crankshaft 2 and at half speed thereof, as seen from the crankcase, when the auxiliary shaft 16 is held at a fixed angular position with respect to the crankcase. The ratio between the diameters of the crank member gear 12 and the auxiliary gear 14 is two.

The engine 1 also comprises a control mechanism for adjusting the rotational position of the crank member 6 with respect to the crankshaft 2 at virtual standstill of the crankshaft 2 in order to be able to vary the compression ratio. The compression ratio can be varied between a minimum compression ratio and a maximum compression ratio. The embodiment as shown in FIGS. 1 and 2 has a control mechanism, wherein the angular position of the auxiliary shaft 16 may be changed so as to modify the actual compression ratio of the engine 1, since the crank member 6 is drivably coupled to the auxiliary shaft 16.

Upon changing the rotational position of the crank member 6 with respect to the crankshaft 2 at a virtual standstill of the crankshaft 2, the position of the piston 11 with respect to the crankcase varies in its top dead center. This provides the opportunity to increase compression ratio at part load conditions. The highest compression ratio is achieved when at top dead center the location of maximum eccentricity P of the bearing portion 7, the crankpin axis 4 and the crankshaft axis 5 lie within a plane whereas the crankpin axis 4 extends between the location of maximum eccentricity P and the crankshaft axis 5. This condition is illustrated in FIG. 2.

In order to switch the engine 1 to a higher part-load condition or full-load condition the control mechanism can adjust the rotational position of the crank member 6 with respect to the crankpin 3 at a virtual standstill of the crankshaft 2.

Since the crank member 6 rotates at half speed of the crankshaft 2 and the mutual rotational positions of the crank member 6 and the crankpin 3 vary at each rotational position of the crankshaft 2 under operating conditions, lubrication requires special attention. Oil between the bearing portion 7 and the big end 8 of the connecting rod 9 is supplied from the inner side of the crankshaft 2 through the crankpin 3 and the crank member 6 to openings 21, 22 in the circumferential wall of the bearing portion 7, see FIG. 2. In order to provide sufficient supporting force the actual position of the openings 21, 22 should not be at a location where an actual force of the connecting rod 9 onto the crank member 6 is relatively high, for example due to combustion.

Figure 3:
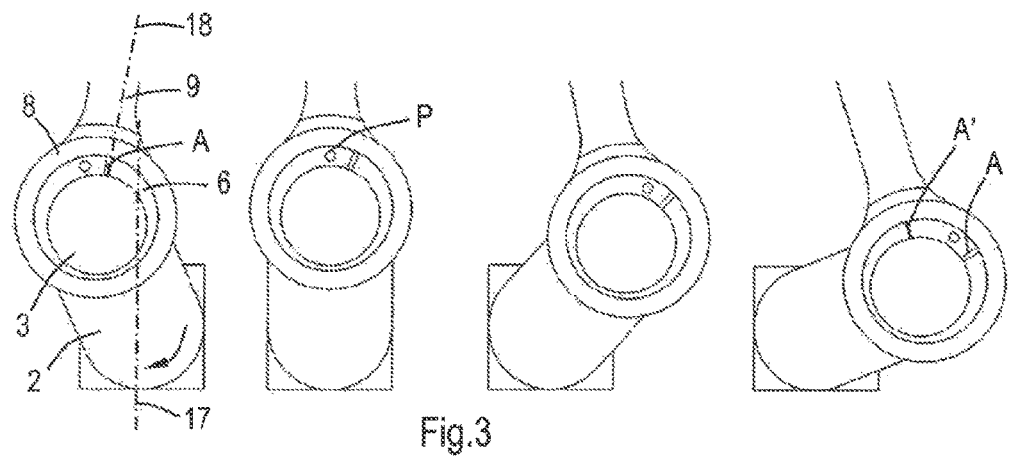
FIGS. 3 and 4 are illustrative views of a part of an internal combustion engine, showing successive steps of the positions of the crank member when the piston approaches and leaves its top dead center at the end of the compression stroke and start of the combustion stroke, in case of high compression ratio and low compression ratio, respectively.
Figure 4:
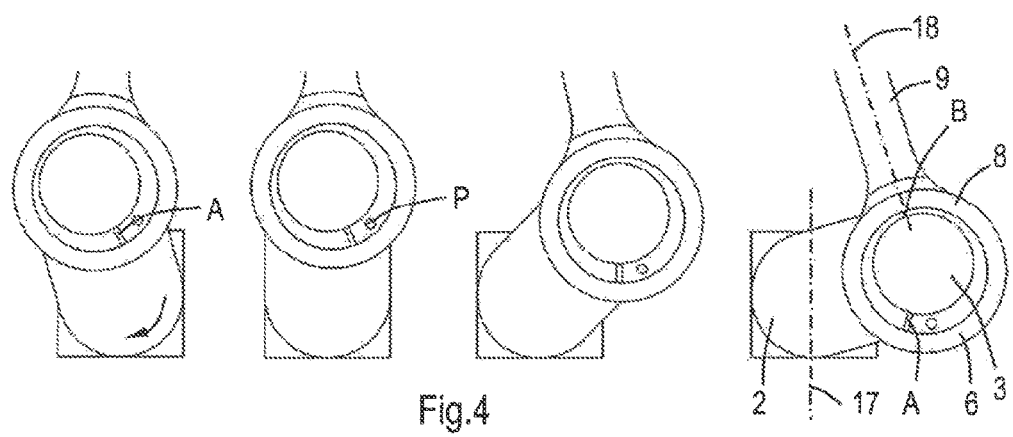

The opening is located outside a closed bearing range of the circumferential wall of the hearing portion 7. The definition of the closed bearing range is illustrated by means of FIGS. 3 and 4, which represent a part-load condition and a high-load or full-load condition of the engine 1, respectively. Both Figures show in successive steps the positions of the crank member 6 and the crankpin 3 when the piston 11 approaches and leaves its top dead center at the end of the compression stroke and the start of the combustion stroke, respectively. Both the crankshaft 2 and crank member 6 rotate clockwise with respect to the crankcase; the crank member 6 at half speed of the crankshaft 2 with respect to the crankcase. FIGS. 3 and 4 also show the piston plane 17 and the connecting rod plane 18. In top dead center the piston plane 17 and the connecting rod plane 18 coincide in the case of FIG. 3. Before top dead center the angle between the piston plane 17 and the connecting rod plane 18 is herein called the pre-angle, whereas after top dead center the angle between the piston plane 17 and the connecting rod plane 18 is herein called the post-angle.

When the piston 11 approaches top dead center cylinder pressure increases due to increasing compression and start of combustion. Usually cylinder pressure reaches a maximum value just after top dead center, for example at 8° crankshaft angle after top dead center. During the period of high pressure the big end 8 of the connecting rod 9 exerts a relatively high force onto the bearing portion 7 of the crank member 6. Therefore, appropriate lubrication between the crank member 6 and the big end 8 is essential. For that reason an opening 21, 22 in the circumferential wall of the bearing portion 7 should be located outside the region of the bearing portion 7 to which the normal substantially coincides with the center line of the connecting rod 9 during the period of increased pressure.

In case of the part-load condition as illustrated in FIG. 3 the location of maximum eccentricity of the bearing portion 7 at top dead center lies in a plane through the crankshaft axis 5 and the crankpin axis 4 and is directed in radial direction from the crankshaft axis 5, such that the maximum possible compression ratio is achieved. The location of the maximum eccentricity is indicated by a small circle with reference sign P in FIG. 3. At a predetermined angle before top dead center, in this case the leftmost picture in FIG. 3, the compression pressure reaches a level at which an opening in the bearing portion 7 is undesired. This is a first edge A of the closed bearing range. An opening in the bearing portion 7 is undesired until the combustion pressure has decreased to an acceptable level after top dead center, in this case the rightmost picture in FIG. 3. When rotating the crankshaft 2 and the crank member 6 further, the presence of an opening would be acceptable; the transition between the range where an opening is undesired and the range where an opening is acceptable is indicated by A' in FIG. 3. FIG. 3 illustrates that the opening must be located outside the range A-A' for the condition of highest compression ratio. It is noted that the range A-A' can be defined as the range having the shortest circumferential distance between A and A'.

However, when increasing engine load, the crank member 6 will be turned clockwise with respect to the crankshaft 2 at a virtual standstill of the crankshaft 2. FIG. 4 illustrates a condition of low compression ratio in which the maximum eccentricity P at the end of the compression stroke in top dead center is turned about 135° about the crankpin axis 4 in clockwise direction with respect to the position shown in FIG. 3. This means that the range where an opening is undesired automatically broadens, i.e. the limit A' as indicated in FIG. 3 shifts anti-clockwise since the location on the bearing portion 7 where the combustion pressure has decreased to an acceptable level after top dead center lies at a greater distance from A. The rightmost picture in FIG. 4 illustrates a situation in which the combustion pressure has decreased to an acceptable level after top dead center where an opening is allowable.

It is noted that in the high-load condition of the engine as shown in FIG. 4, the connecting rod plane 8 and the piston plane 17 do not coincide exactly when the piston 11 is in top dead center, since the crank member 6 is positioned such that the location of maximum eccentricity P is rotated out of the piston plane 17 in that condition. Hence, in top dead center there is a small post-angle.

For an engine as illustrated schematically in FIGS. 3 and 4 the opening should be outside the range A-B. In other words, in this case ode indicated range A-B forms the closed bearing range. The closed bearing range A-B is larger than a half circumference of the bearing portion. As seen from the first edge A of the closed bearing range, the closed bearing range extends in opposite direction of the normal operating direction of the crank member 6 with respect to the crankcase, in this case anti-clockwise from the first edge A.

Figure 5:
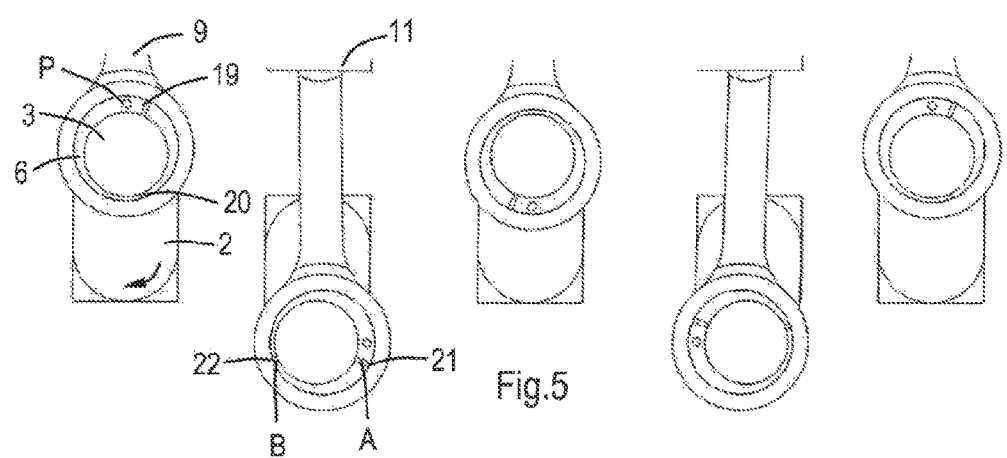
FIGS. 5 and 6 are similar views as FIGS. 3 and 4, but showing rotational positions of the crank member including oil channels at top dead center and bottom dead center in case of high compression ratio and low compression ratio, respectively, for four successive piston strokes.
Figure 6:
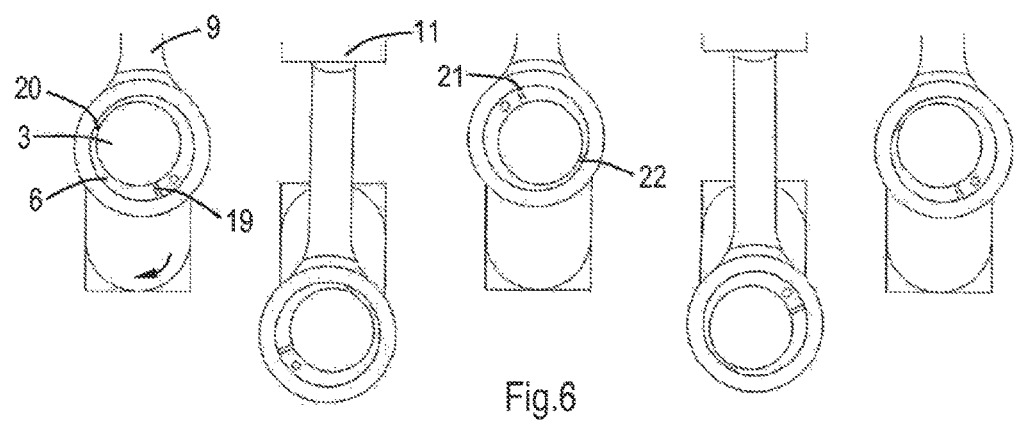

FIGS. 5 and 6 show an embodiment of the engine 1 at successive rotational positions of the crankshaft 2 for a high compression ratio at low load, in FIG. 5, and for a low compression ratio at high load, in FIG. 6. The leftmost pictures represent top dead center at the end of the compression stroke and the next pictures represent bottom dead center at the end of the combustion stroke, top dead center at the end of the exhaust stroke, bottom dead center at the end of the inlet stroke and again top dead center at the end of the compression stroke, respectively. The crank member 6 is provided with a first crank member oil channel 19 and a second crank member oil channel 20 for transporting oil through the crank member 6 to a first opening 21 and a second opening 22, respectively, in the circumferential wall of the bearing portion 7. In this case the openings 21, 22 are located at the first edge A and the second edge B, respectively, of the closed bearing range A-B. In this case the location of maximum eccentricity P lies within the closed bearing range A-B.

The first and second oil channels 19, 20 are provided in radial direction of the crank member 6. The length of the first oil channel 19 is greater than the length of the second oil channel 20, since the first oil channel 19 is located closer to the location of maximum eccentricity P.

Figure 7:
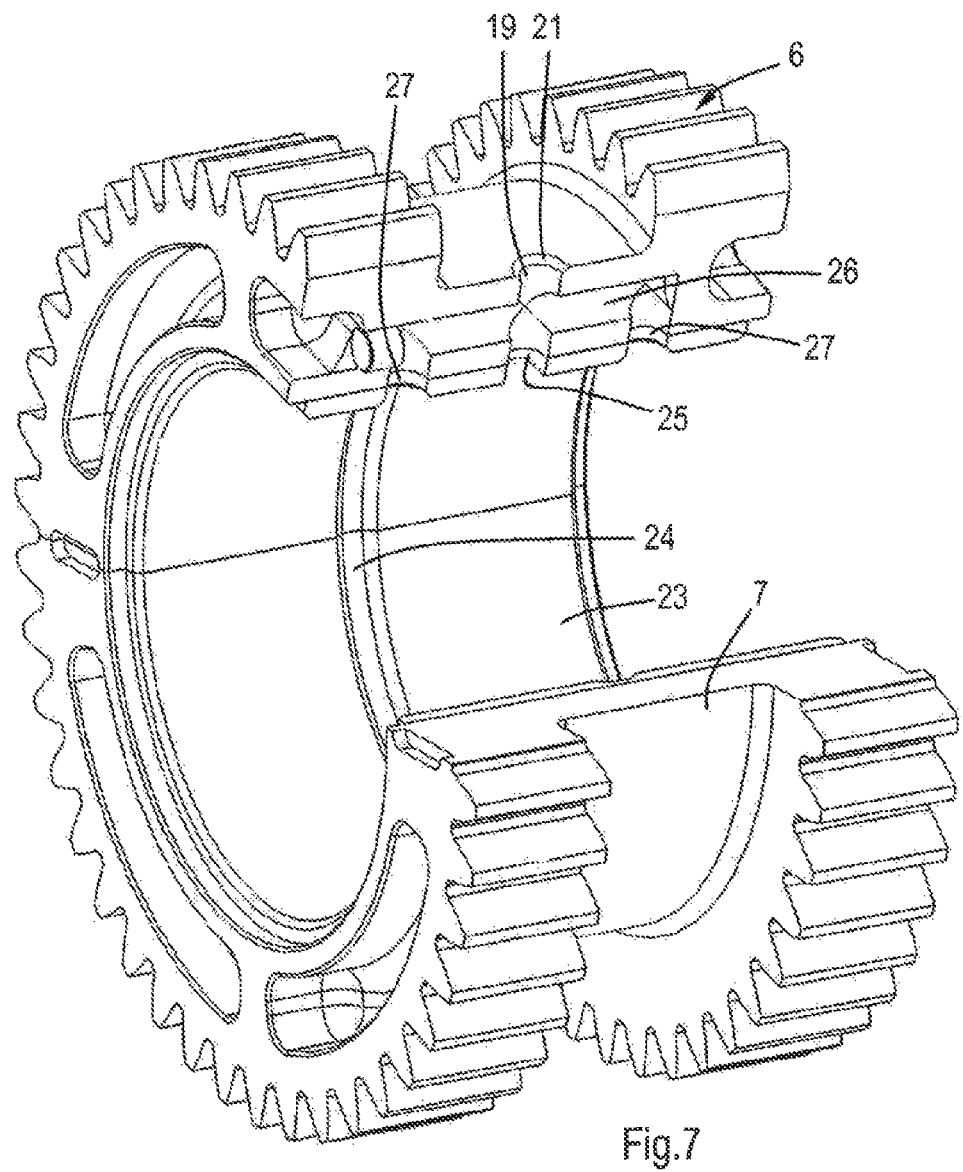
FIGS. 7 and 8 are perspective views of alternative embodiments of a crank member.
Figure 8:
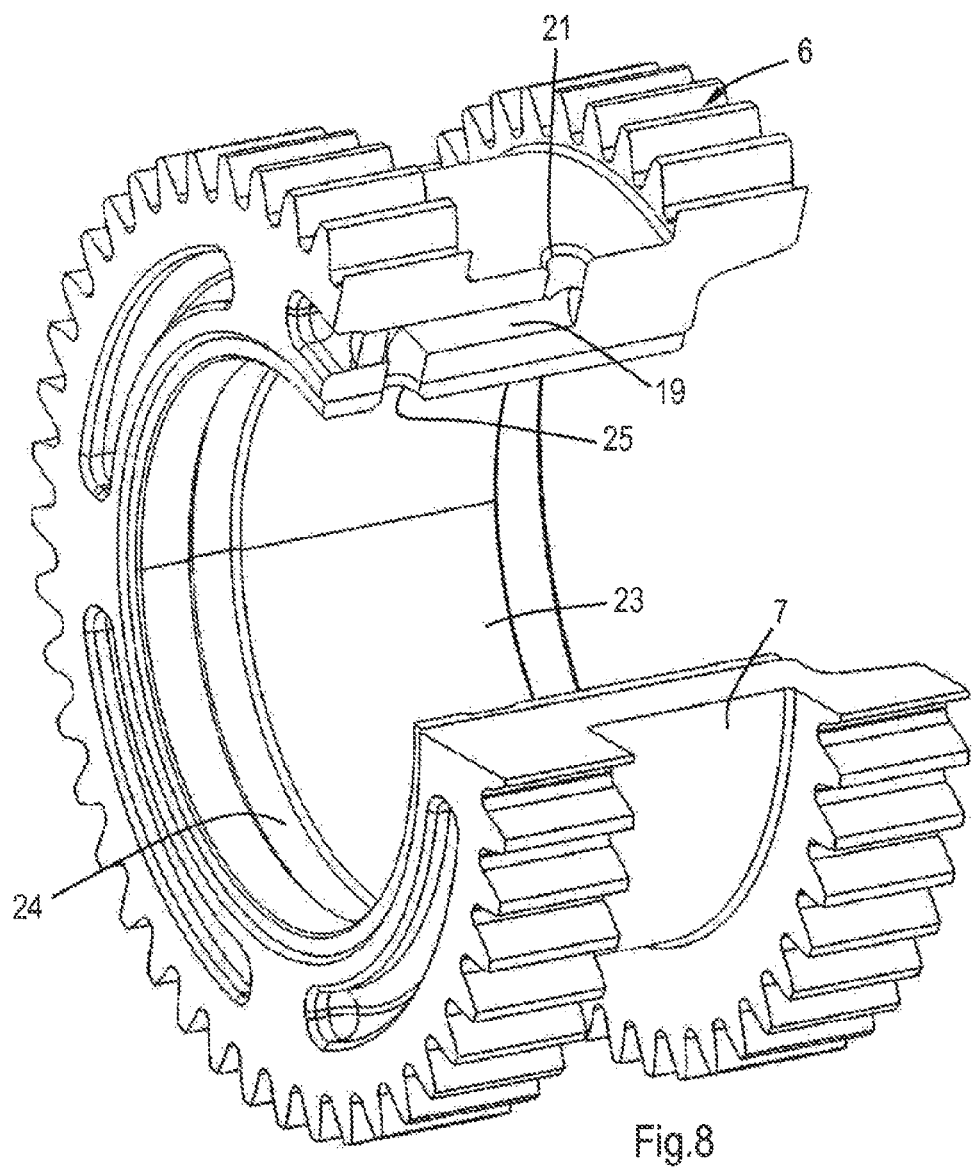

FIGS. 7 and 8 show two alternative embodiments of the crank member 6. The crank members 6 are provided with bearing cups 23. In the embodiment of FIG. 7 a circular oil channel 24 is present between axial outer sides of the crank member 6, but could also have been located in a circular slot of the crankpin 3. Under operating conditions oil flows from the interior of the crankshaft 2 through a hole in the crankpin at the oil channel 24 in the bearing cups 23 via a hole 25 in the bearing cups 23 to a cavity 26, from which the oil can flow through holes 27 between the bearing cups 23 and the crankpin 3, on the one hand, and through the opening 21 between the bearing portion 7 and the big end 8 of the connecting rod 9, on the other hand. The cavity is formed by an elongated hole that extends in axial direction of the crank member 6.

In the embodiment of FIG. 7 there is only one opening 21 in the circumferential wall of the bearing portion 7, which communicates with the circular oil channel 24 in the bearing cups 23 via the oil channel 19. In this case, the opening and the oil channel correspond to the first opening 21 and the first oil channel 19, respectively, of the embodiment as shown in FIGS. 5 and 6. If the embodiment of the crank member of FIG. 7 was provided with a second oil channel and a second opening, it would still be advantageous to have the cavity 26 located at the first oil channel 19 because of its relatively short distance to the location of maximum eccentricity which provides sufficient space for incorporating the cavity 26 in the crank member 6.

The embodiment of the crank member 6 as shown in FIG. 7 is composed of two parts to be mounted on the crankshaft 2 which is made of one piece. Several embodiments of crank members that are composed of two parts are disclosed in EP 13193563.7 of the same applicant as the present application. Such a crank member 6 provides the opportunity to apply a relatively wide crank member 6 in longitudinal direction. Hence, in comparison to a crank member which is mounted as a single part on the crankpin after which the crankpin is attached to the rest of the crankshaft by means of a press connection between separate parts of the crankshaft, the composed crank member 6 may have relatively wide bearing cups 23 which is advantageous in case of the presence of the circular oil channel 24 in the bearing cups 23. A press connection needs a minimum contact surface in longitudinal direction of the crankshaft, which allows a relatively short crank member for compactness of the engine.

The embodiment of the crank member 6 according to FIG. 8 is made of one piece. The bearing cups 23 are two halves. It has a similar circular oil channel 24 as the embodiment of FIG. 7, but this one is located outside the axial center of the crank member 6. This results in a relatively wide main bearing surface of the bearing cups 23. Under operating conditions oil flows from the interior of the crankshaft 2 through a hole in the crankpin 3 at the oil channel 24 via a hole 25 in the bearing cups 23 through the oil channel 19 to the opening 21 in the circumferential wall of the bearing portion 7. The embodiment of FIG. 8 is less suitable for applying a second opening and a second oil channel, since a second oil channel from the circular oil channel 24 to a second opening in longitudinal direction of the crank member 6 requires sufficient material at the intended location of the second oil channel in the rank member 6. At increasing distance from the location of maximum eccentricity less material is available. In the embodiment of FIG. 7 the application of a second opening is easier since the second oil channel may extend radially from the circular oil channel 24 since a longitudinal second oil channel may be omitted.

Figure 9:
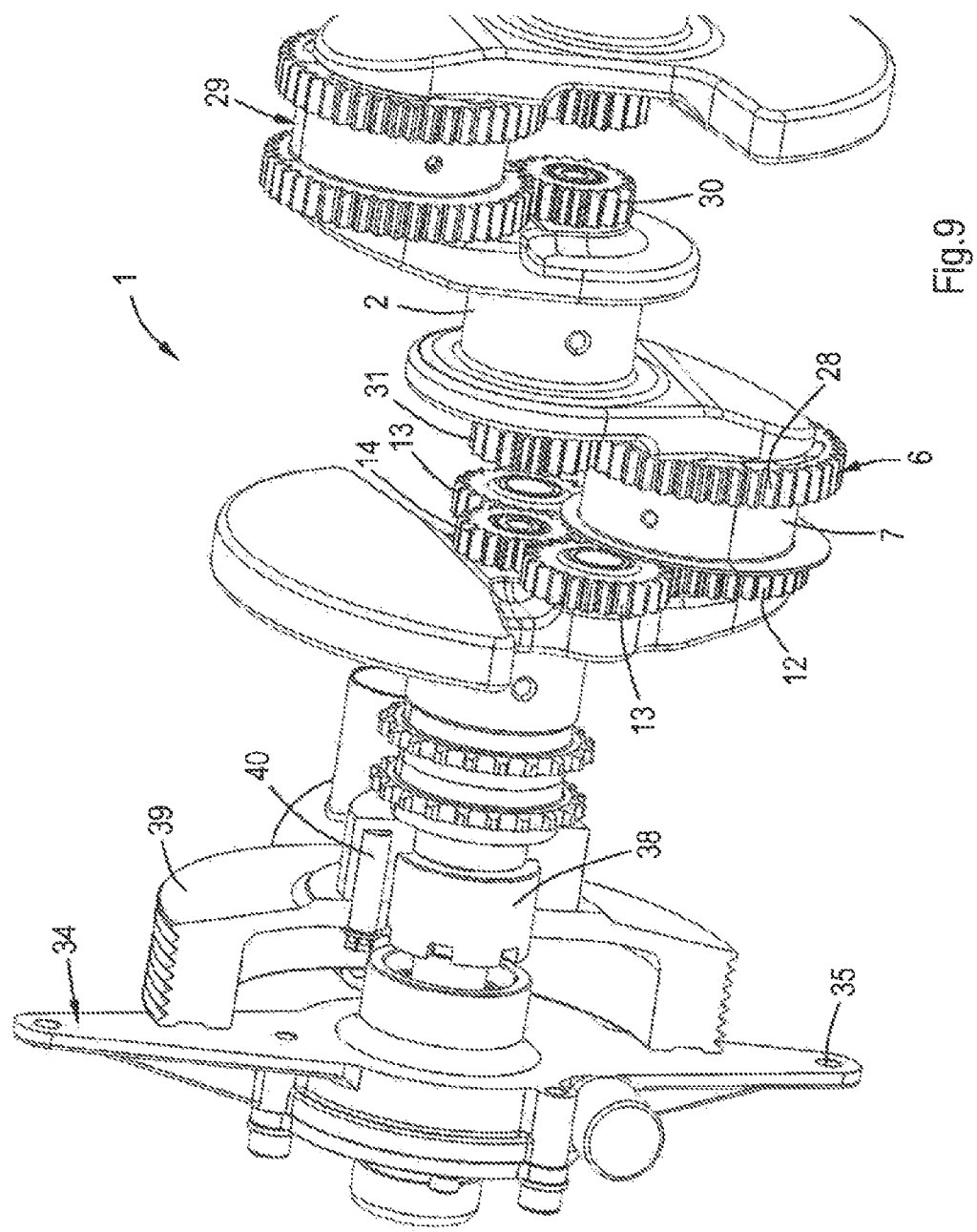
FIG. 9 is a similar view as FIG. 1, but showing an alternative embodiment of the engine including a control mechanism housing, in partly cut-away view.

FIG. 9 shows an embodiment of a part of an internal combustion engine 1 with variable compression ratio. Similar to the embodiment as shown in FIGS. 1 and 2 the engine is provided with intermediate gears 13 that mesh with the auxiliary gear 14, whereas the auxiliary gear 14 is fixed to an auxiliary shaft 16 which extends concentrically through the crankshaft 2. The crank member 6 comprises the crank member gear 12 as well as a further crank member gear 28 which is located at the opposite side of the bearing portion 7. The further crank member gear 28 drives another crank member 29 at another crankpin through a gear mechanism. The gear mechanism comprises a transfer shaft including external gears 30, 31, which transfer shaft is rotatable with respect to the crankshaft 2 about the crankshaft axis 5 and which extends concentrically through the crankshaft 2. The gears 30, 31 mesh with the crank member gears of the further crank member 29 and the crank member 6.

Figure 10:
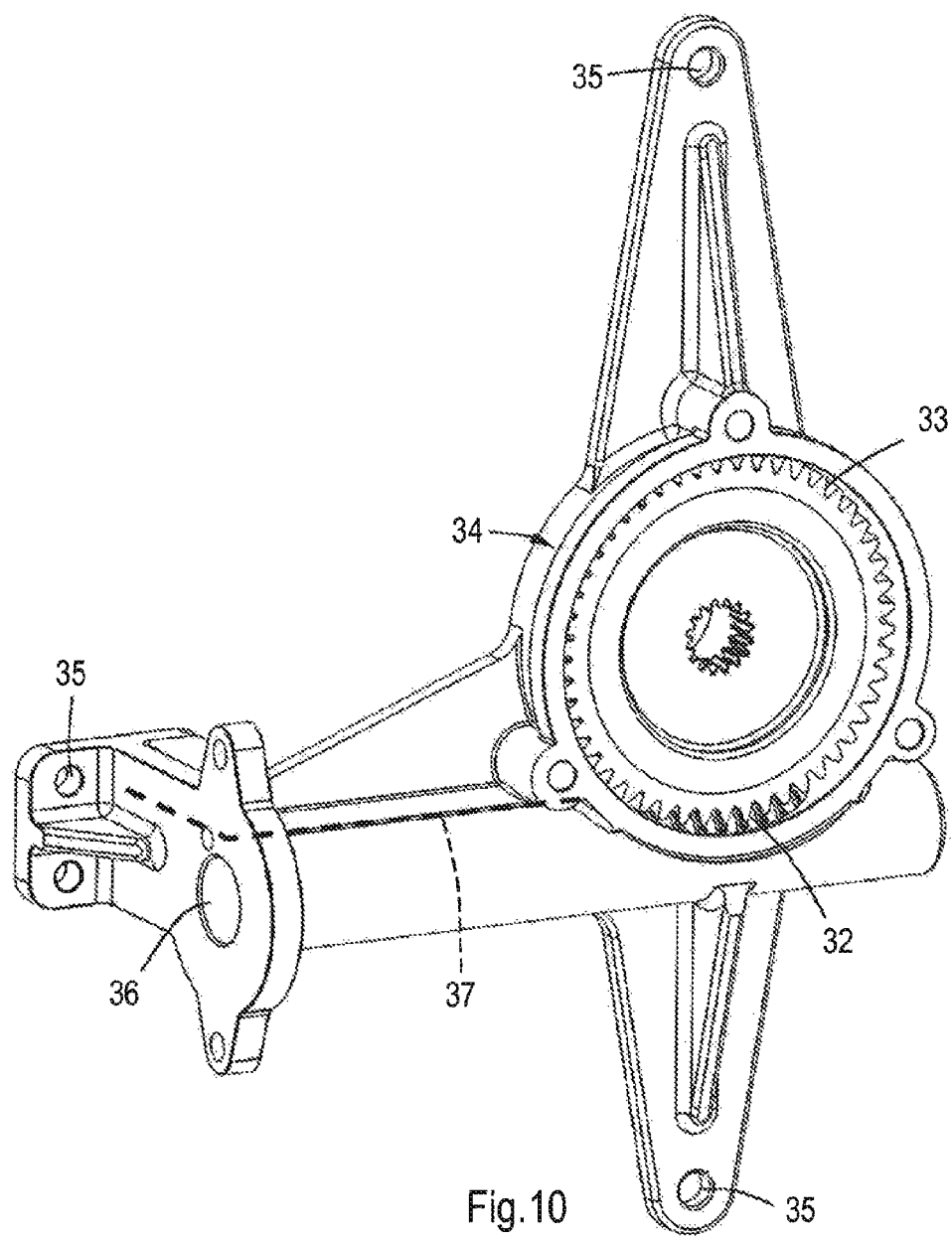
FIGS. 10 and 11 are similar views as FIG. 9, but showing the control mechanism housing on a larger scale and from opposite sides.
Figure 11:
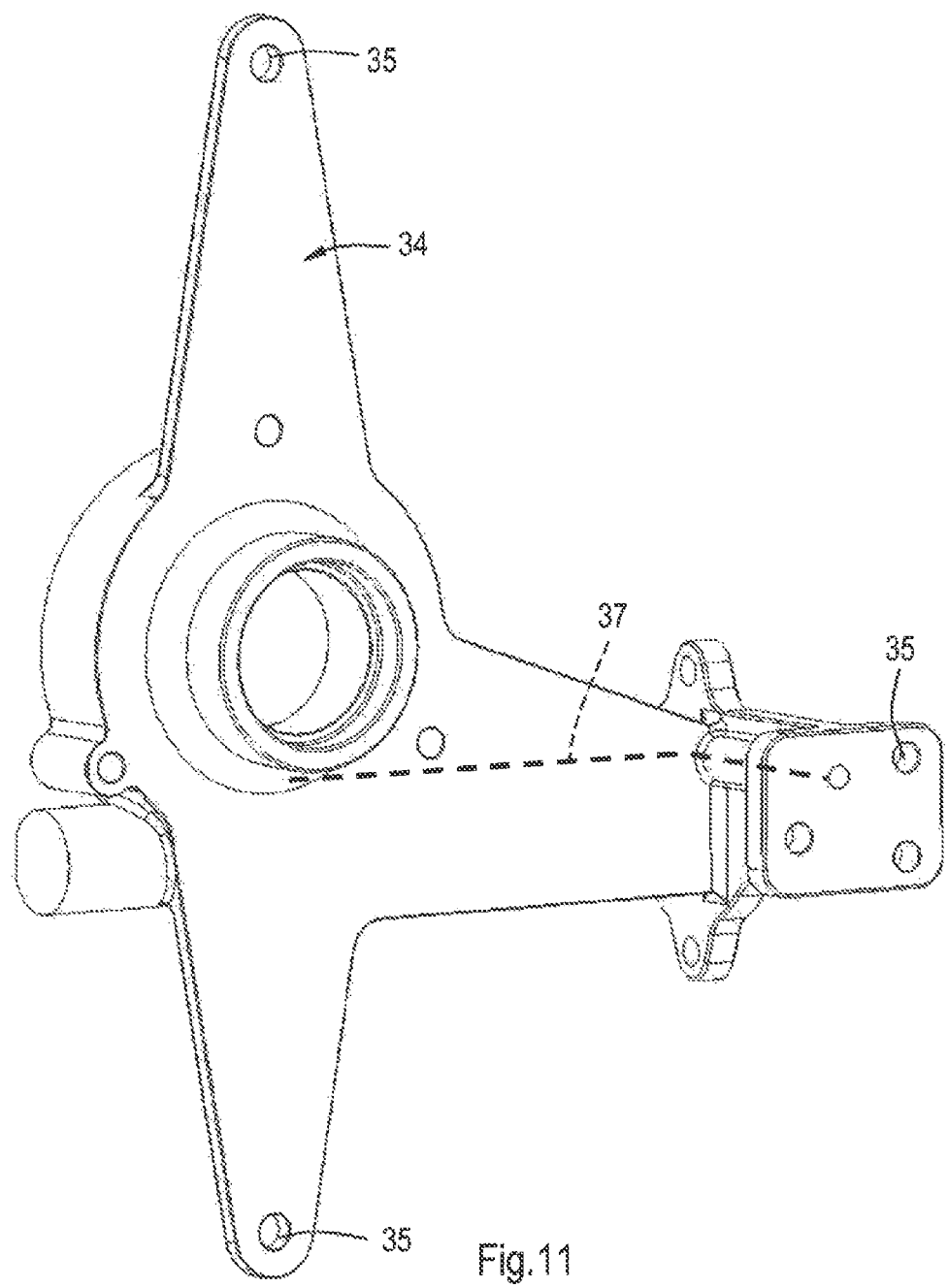

In the embodiment as shown in FIG. 9 the engine comprises an electric motor (not shown) for driving the auxiliary gear 14 via a worm 32 and worm gear 33 which is fixed to the auxiliary shaft 16. The worm 32 and worm gear 33 are shown in FIG. 10. The worm 32 is fixed to a worm shaft that extends perpendicularly to the crankshaft axis 5. Upon rotation of the worm 32 the top and bottom dead center of the pistons 11 will be influenced. In case of running at fixed compression ratio the auxiliary shaft 16 stays at a fixed rotational position with respect to the crankcase. The worm 32 and worm gear 33 are located in a control mechanism housing 34 which is shown as seen from opposite sides in FIGS. 10 and 11. FIG. 11 shows the back side which is directed to the crankshaft 2.

The control mechanism housing 34 is mounted to the crankcase by means of bolts that extend through holes 35. The electric motor for driving the worm shaft is mounted at the left side of FIG. 10 at a channel 36 in which the worm shaft is accommodated. The control mechanism housing 34 comprises an internal oil channel 37 which extends from the location of the worm 32 to the crankcase as illustrated in FIGS. 10 and 11. As a consequence, under operating conditions there is an oil flow from the inner side of the crankshaft 2 between the auxiliary shaft 16 and the crankshaft 2 in outward direction towards the control mechanism housing 34. The oil flows through the chamber in which the worm 32 and worm gear 33 are present and through the oil channel 37 back into the crankcase. The chamber is sealed by a cover.

FIG. 9 shows that a pulley 39 is attached to the crankshaft 2 by means of a ring to which the pulley is fixed through bolts whereas the ring is clamped against a collar on the crankshaft 2 via a pulley nut 38 that is screwed onto the crankshaft 2. The auxiliary shaft 16 extends through a central hole of the pulley nut 38.

Figure 12:
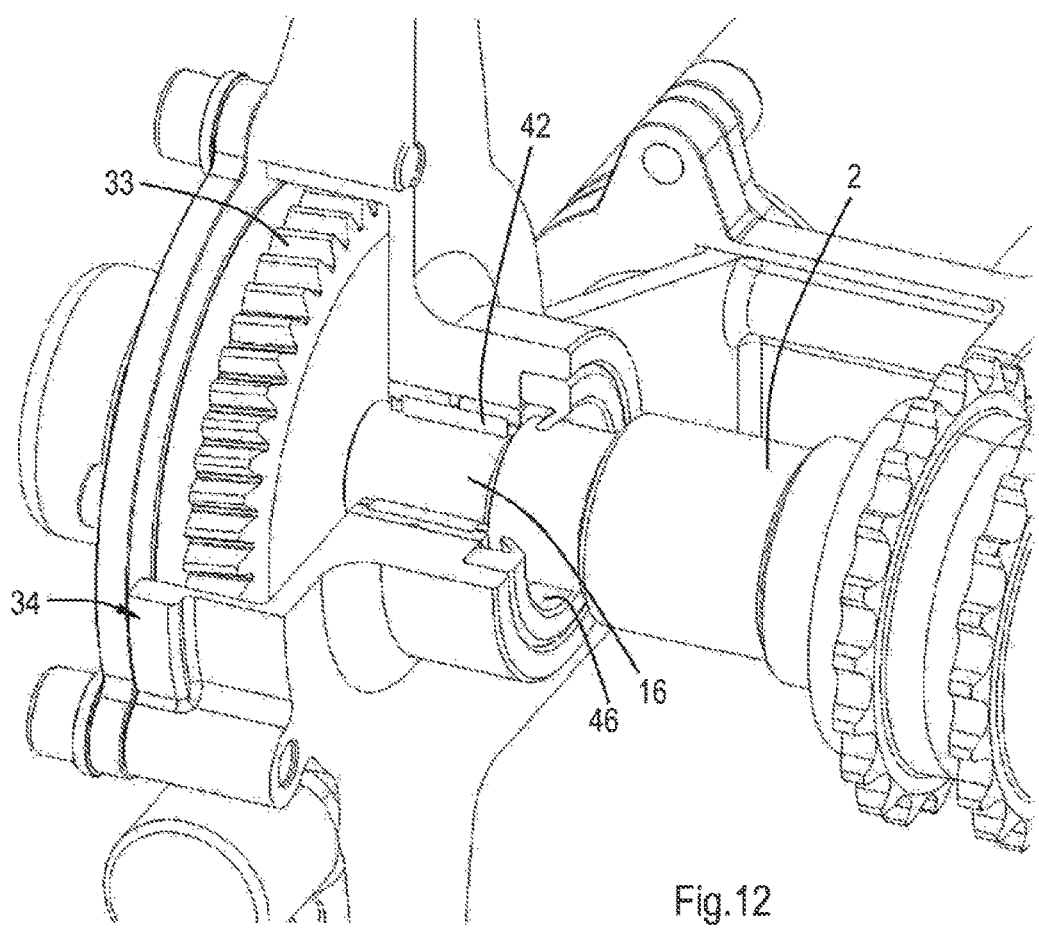
FIG. 12 is a perspective cut-away view of a part of the embodiment of FIG. 9 on a larger scale.

FIG. 12 shows a part of the engine 1 of FIG. 9 in more detail. For clarity reasons the pulley 39 and the pulley nut are not shown. FIG. 12 illustrates that an oil seal ring 46 is mounted in the control mechanism housing 34. An end portion of the auxiliary shaft 16 extends beyond an end of the crankshaft 2 and is supported by a needle bearing 42. Under operating conditions oil flows between the auxiliary shaft 16 and the crankshaft 2 through the needle bearing 42 to the chamber in which the worm 32 and worm gear 33 are located.

FIG. 13 shows in cross section a part of the crankshaft 2 of the embodiment of the engine 1 as shown in FIG. 9. FIG. 13 shows the external gears 30, 31, which are fixed to the transfer shaft 40 that is rotatable with respect to the crankshaft 2 about the crankshaft axis 5 and which extends concentrically through the crankshaft 2. The gears 30, 31 mesh with respective crank member gears of further crank members, which are not shown in FIG. 13. The crankshaft 2 has crankshaft bearings 41 where lubricant is supplied through respective crankshaft holes 45 to the interior of the crankshaft 2 under operating conditions.

Opposite end portions of the transfer shaft 40 are supported by the crankshaft 2, whereas a central portion of the transfer shaft 40 has a smaller diameter than the opposite end portions in order to create a cavity 43 between the central portion and the crankshaft 2. From the cavity 43 lubricant is supplied to the opposite end portions of the transfer shaft 40 as well as to the adjacent crankpins 3 via respective crankshaft channels 44. It is noted that the crankshaft channels 44 may be less inclined with respect to the crankshaft axis than in case of conventional engines without variable compression ratio due to the presence of relatively wide crank members 6.

From the foregoing, it will be clear that the invention provides a four-stroke internal combustion engine with variable compression ratio which has appropriate lubrication properties.

The invention is not limited to the embodiments shown in the drawings and described hereinbefore, which may be varied in different manners within the scope of the claims and their technical equivalents.

The invention claimed is:

1. A four-stroke internal combustion engine with variable compression ratio, comprising:
   a crankcase;
   a crankshaft being rotatable with respect to the crankcase about a crankshaft axis, wherein the crankshaft has a crankpin including a crankpin axis;
   a connecting rod including a big end and a small end, wherein the connecting rod has a center line which lies in a connecting rod plane;
   a piston being rotatably connected to the small end, wherein the piston is movable in a direction parallel to a piston plane in which the crankshaft axis lies;
   a crank member being rotatably mounted on the crankpin, and comprising a bearing portion which is eccentrically disposed with respect to the crankpin, wherein the bearing portion has an outer circumferential wall including a location of maximum eccentricity (P) which bears the big end of the connecting rod such that the connecting rod is rotatably mounted on the bearing portion of the crank member via the big end, wherein the bearing portion has a center line which lies in the connecting rod plane, wherein under operating conditions at or close to top dead center of the piston an angle between the connecting rod plane and the piston plane changes from a pre-angle before top dead center to a post-angle after top dead center;
   a drive mechanism coupled to rotate the crank member (6) with respect to the crankshaft, which is configured such that the crank member rotates in the same direction as the crankshaft, whereas a rotation frequency of the crank member is substantially half of that of the crankshaft, as seen from the crankcase; and
   a control mechanism configured to adjust a mutual rotational position of the crank member and the crankpin at a virtual standstill of the crankshaft in order to be able to vary the compression ratio between a minimum compression ratio and a maximum compression ratio;
   wherein the crank member is provided with at least a crank member oil channel configured to adjust oil through the crank member to an opening in the circumferential wall of the bearing portion, wherein the opening is located outside a closed bearing range (A-B) having a first edge (A) and a second edge (B);
   wherein the first edge (A) is located at an intersection with the connecting rod plane where the circumferential wall faces the piston at a predetermined pre-angle in the condition of maximum compression ratio close to an end of a compression stroke;
   wherein the second edge (B) is located at an intersection with the connecting rod plane where the circumferential wall faces the piston at a predetermined post-angle in the condition of minimum compression ratio in a combustion stroke;
   wherein the closed bearing range (A-B) extends from the first edge (A) in a direction opposite to a rotational direction of the crank member with respect to the crankcase under operating condition at fixed compression ratio.

2. The internal combustion engine according to claim 1, wherein the condition of maximum compression ratio is created by selecting the mutual rotational position of the crank member and the crankpin such that at the end of the compression stroke in top dead center the location of maximum eccentricity (P) lies in the piston plane beyond the crankpin axis (4) as seen from the crankshaft axis.

3. The internal combustion engine according to claim 1, wherein the condition of minimum compression ratio is created by selecting the mutual rotational position of the crank member and the crankpin such that at the end of the compression stroke in top dead center the location of maximum eccentricity (P) lies at an angle between 90 and 180° about the crankpin axis from an intersection between the piston plane and a side of the bearing portion facing the piston, in the rotational direction of the crank member with respect to the crankcase.

4. The internal combustion engine according to claim 3, wherein the angle is between 120 and 150°.

5. The internal combustion engine according to claim 1, wherein the location of maximum eccentricity (P) lies within the closed bearing range (A-B).

6. The internal combustion engine according to claim 1, wherein the opening is a first opening and the circumferential wall of the bearing portion is provided with a second opening configured to supply oil between the bearing portion and the big end, wherein the first opening is provided at the first edge (A) and the second opening is provided at the second edge (B) of the closed bearing range (A-B).

7. The internal combustion engine according to claim 1, wherein the pre-angle and post-angle are selected such that in top dead center at the end of the compression stroke at the maximum compression ratio the first edge (A) lies at an angle between 10 and 30° about the crankpin axis from an intersection between the piston plane and a side of the bearing portion facing the piston, in the rotational direction of the crank member with respect to the crankcase, whereas the second edge (B) lies at an angle between 150 and 170° about the crankpin axis from an intersection between the piston plane and a side of the bearing portion facing the piston, in the rotational direction of the crank member with respect to the crankcase.

8. The internal combustion engine according to claim 1, wherein the oil channel comprises a through-hole extending radially through the bearing portion to an inner wall opening in an inner wall of the crank member, which inner wall opening is located at or close to a center of the crank member in a longitudinal direction thereof.

9. The internal combustion engine according to claim 8, wherein the oil channel has a branch extending in the longitudinal direction of the crank member configured to supply oil to the crankpin at a location of the inner wall of the crank member which is remote from the inner wall opening in the longitudinal direction of the crank member.

10. The internal combustion engine according to claim 1, wherein the opening communicates through the oil channel with an inner wall opening in an inner wall of the crank member, which inner wall opening lies at a distance from the opening in a longitudinal direction of the crank member.

11. The internal combustion engine according to claim 10, wherein the crank member is made of one piece that is mounted on the crankpin before assembly of the crankshaft.

12. The internal combustion engine according to claim 1, wherein the control mechanism comprises a worm and a worm gear which is fixed to an auxiliary shaft, which are located in a chamber that communicates with a space between the auxiliary shaft and the crankshaft.

13. The internal combustion engine according to claim 1, wherein the crank member and the crankpin are a first crank member and a first crankpin, respectively, wherein the engine comprises a second crank member and an associated second crankpin, wherein a crankshaft bearing is located between the crankpins, and wherein the crank members are drivably coupled to each other via a transfer shaft which is rotatably and concentrically mounted in the crankshaft at the crankshaft bearing, wherein opposite end portions of the transfer shaft are supported by the crankshaft, whereas a cavity is present between a central portion of the transfer shaft and the crankshaft, which cavity communicates with an outer side of the crankshaft at the crankshaft bearing, on the one hand, and with the outer sides of the respective crankpins, on the other hand.

* * * * *